United States Patent
Gortler et al.

(10) Patent No.: US 6,399,916 B1
(45) Date of Patent: *Jun. 4, 2002

(54) APPARATUS FOR PURGING THE BEAM PATH OF A UV LASER BEAM

(75) Inventors: Andreas Gortler, Bamberg; Andreas Haupt, Gottingen, both of (DE)

(73) Assignee: Lambda Physik AG, Goettingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,580

(22) Filed: Aug. 10, 1998

(30) Foreign Application Priority Data

Aug. 11, 1997 (DE) .......................... 197 34 715

(51) Int. Cl.[7] .......................... B23K 26/12; B23K 26/14
(52) U.S. Cl. ................................. 219/121.84
(58) Field of Search .................... 219/121.84, 121.6, 219/121.86

(56) References Cited

U.S. PATENT DOCUMENTS

| | | | |
|---|---|---|---|
| 4,616,908 A | * 10/1986 | King | 359/505 |
| 5,051,558 A | 9/1991 | Sukhman | 219/121.68 |
| 5,221,823 A | * 6/1993 | Usui | 219/121.78 |
| 5,559,584 A | * 9/1996 | Miyaji et al. | 355/73 |
| 5,763,855 A | * 6/1998 | Shioji | 219/121.84 |
| 5,811,753 A | * 9/1998 | Weick et al. | 219/121.78 |

FOREIGN PATENT DOCUMENTS

JP    8-55792    * 2/1996

OTHER PUBLICATIONS

James A. R. Samson, GCA Corporation, "Techniques of Vacuum Ultraviolet Spectroscopy", John Wiley & Sons, Inc., New York, No Date Available.
"Untersuchungen zum Laserstrahl–schweiBen mit 1–kW–Nd:YAG– Laser Unter Einsatz verschiedener Schutzgasgemische" ("Study of Laser Beam Welding with a w–KW–Nd:YAG Lser Using Different Mixtures of Protective Gases"), Journal Schweissen and Schneiden, 1997, pp. 420–424. Translation of Abstract in body of IDS.
McKee, T., "Spectral–narrowing Techniques for Excimer Laser Oscillators," CAN J. Phys., vol. 63, 1985, pp. 214–219.
Ishchenko, V. N., et al., "High–power Efficient Vaccuum Ultraviolet F2 Laser Excited by an Electric Discharge," Sov. J. Quantum Electron, 16(5), May 1986, pp. 707–709.

* cited by examiner

Primary Examiner—Samuel M. Heinrich
(74) Attorney, Agent, or Firm—Sierra Patent Group, Ltd.; Andrew V. Smith

(57) ABSTRACT

A device for flushing the optical path of a UV laser beam has a casing (18) with which the optical path is separated from the external atmosphere (26). In order to maximize the life of the optical components (24, 26) in the optical path, a noble gas, in particular argon, is used for flushing the optical path.

7 Claims, 2 Drawing Sheets

APPARATUS FOR PURGING THE BEAM PATH OF A UV LASER BEAM

The invention relates to a device for flushing the optical path of a UV laser beam, having a casing separating the optical path from the external atmosphere.

It is known in the prior art to flush the optimal path of a UV laser beam (that is to say of a laser beam having a wavelength in the ultraviolet range) with nitrogen (J. A. R. Samson (Ed.): Techniques of vacuum ultraviolet spectroscopy, New York, 1967). This prior art is based on recognition of the fact that UV laser beams, in particular with a wavelength of 193 nm, produce ozone in atmospheric oxygen, and this causes a range of technical problems. In particular, ozone should be avoided because it can irritate the airways. Furthermore, however, ozone also absorbs the laser radiation and thus attenuates the laser beam. In order to avoid this, in the prior art, the entire beam path from the output-coupling optical unit of the laser system to the object to be illuminated is encapsulated in such a way that the encapsulated space is hermetically sealed from the space outside. The encapsulation involves a casing around this space with a suitable wall. Next, according to the prior art, nitrogen is introduced into the space with a slightly positive pressure relative to the atmosphere. Once the entire system has been filled with nitrogen, the laser radiation can reach the workpiece without losses and without producing detrimental ozone. A further possible way which the prior art mentioned above proposes for avoiding the formation of ozone is to evacuate the space containing the optical path. However, this elaborate measure is used primarily for extremely short UV wavelengths, that is to say wavelengths considerably shorter than 193 nm, since in cases such as these the radiation is absorbed in the gas.

The present invention is based on recognition of the fact that, in the case of UV laser radiation, flushing the optical path with nitrogen may be detrimental to optical components in the optical path of the laser, for example windows, lenses, mirrors, prisms, etc., and in particular the optical quality of the surfaces of the optical components may be impaired. This is in particular true of optical components made from $CaF_2$, for which surface flaking may result. Optical components of this type in the optical path of a laser beam are, in particular, needed for focusing and/or rendering uniform the laser beam on the workpiece to be illuminated.

The present invention is furthermore based on recognition of the surprising fact that the aforementioned technical problems which occur when nitrogen is used no longer occur if the optical path of the UV laser beam is flushed with noble gas. Argon, in particular, has been found to be highly suitable for this purpose.

The solution according to the invention exhibits particularly good results for excimer laser radiation with a wavelength of 193 nm and for the fifth harmonic of Nd:YAG lasers (212.8 nm).

The invention is thus suitable, in particular, for wavelengths of less than 220 nm down to shorter wavelengths, so long as the radiation is not absorbed by the noble gas. This leads to a preferred wavelength range of from about 220 nm to about 150 nm.

An illustrative embodiment of the invention will be explained in more detail below with reference to the schematic drawing, in which.

Figure 1:
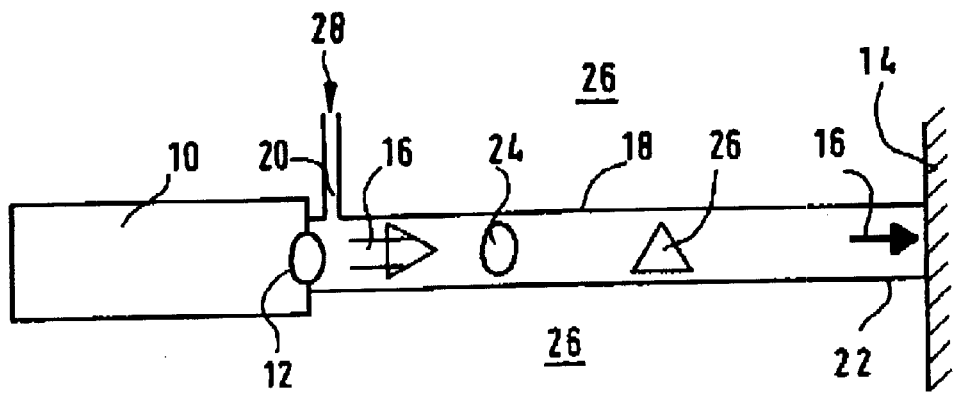
FIG. 1 shows a first illustrative embodiment of a device for flushing the optical path of an excimer laser.

The figure schematically shows an excimer laser 10 with an output-coupling optical unit 12 through which the laser beam 16 is emitted. The laser beam 16 is directed at an object 14 to be illuminated. From the output-coupling optical unit 12 of the excimer laser 10 as far as the object 14 to be illuminated, the optical path of the laser beam 16 is encapsulated from the external atmosphere 26 by a casing 18. The space inside the casing 18 can therefore be filled with a chosen gas. In the illustrative embodiment which is represented, the casing 18 is in the form of an elongate tube which accommodates the optical path of the laser. Arranged inside the casing 18 there are optical components which are used for focusing the laser beam on the object 14 to be eliminated, for example lenses 24, prisms 26 or further optical components, such as gratings etc. In particular, the aforementioned optical components are made of $CaF_2$.

The casing 18 has an inlet 20 and an outlet 22. The inlet 20 and the outlet 22 may be provided with valves, in particular one-way valves, so that, at any time, the admitted gas has a specific pressure inside the casing 18.

The gas is fed to the inlet 20 via a gas supply 28, and preferably at a slight positive pressure relative to the external atmosphere 28. The one-way valve at the outlet 22 opens at a specific slight positive pressure and thus keeps the gas pressure inside the casing 18 constant.

A noble gas, in particular argon, is chosen as the gas inside the casing 18. By means of this, maximum intensity for the UV laser radiation 16' focused onto the object 14 and maximum stability of the optical components 24, 26 are achieved.

Figure 2:
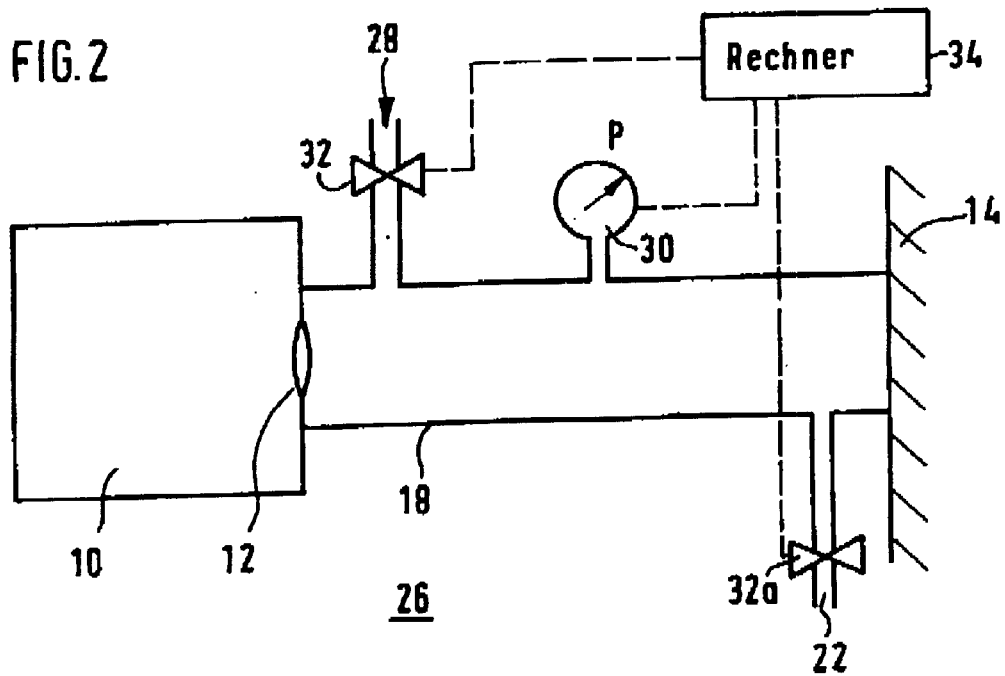
FIG. 2 shows a refinement of the illustrative embodiment according to FIG. 1.

The illustrative embodiment described above with reference to FIG. 1 may be further configured according to FIG. 2. In the figures, components which correspond to one another or have similar functions are provided with the same references, so that these components need not be described again. In the illustrative embodiment according to FIG. 2, the beam of the excimer laser likewise propagates through a noble gas, in particular argon, in the casing 18. In addition, a pressure sensor 30 is provided which measures the gas pressure in the casing 18 and supplies a computer 34 with a signal corresponding to the result of the measurement. A controllable valve 34 is arranged at the inlet 20 into the casing 18 and, correspondingly, a further controllable valve 32a is arranged at the outlet 22. The two valves 32, 32a are controlled by the computer 34, to be precise according to the result of the measurement by the pressure sensor 30, in such a way that the gas pressure inside the casing 18 is kept constant at a specified value. The fact that the pressure in the casing 18 is kept constant has the advantage that an optical system arranged in the optical path can be stably maintained.

The possibility of controlling the pressure in the casing 18, according to the above-described illustrative embodiment according to FIG. 2, furthermore opens up the possibility of using a change in the optical density in the casing 18 to change the wavelength as well, if corresponding optical components, which are per se known to the person skilled in the art, are arranged in the casing 18. This type of adjustment and control of the wavelength is of importance, in particular, for narrow-band microlithography lasers.

Figure 3:
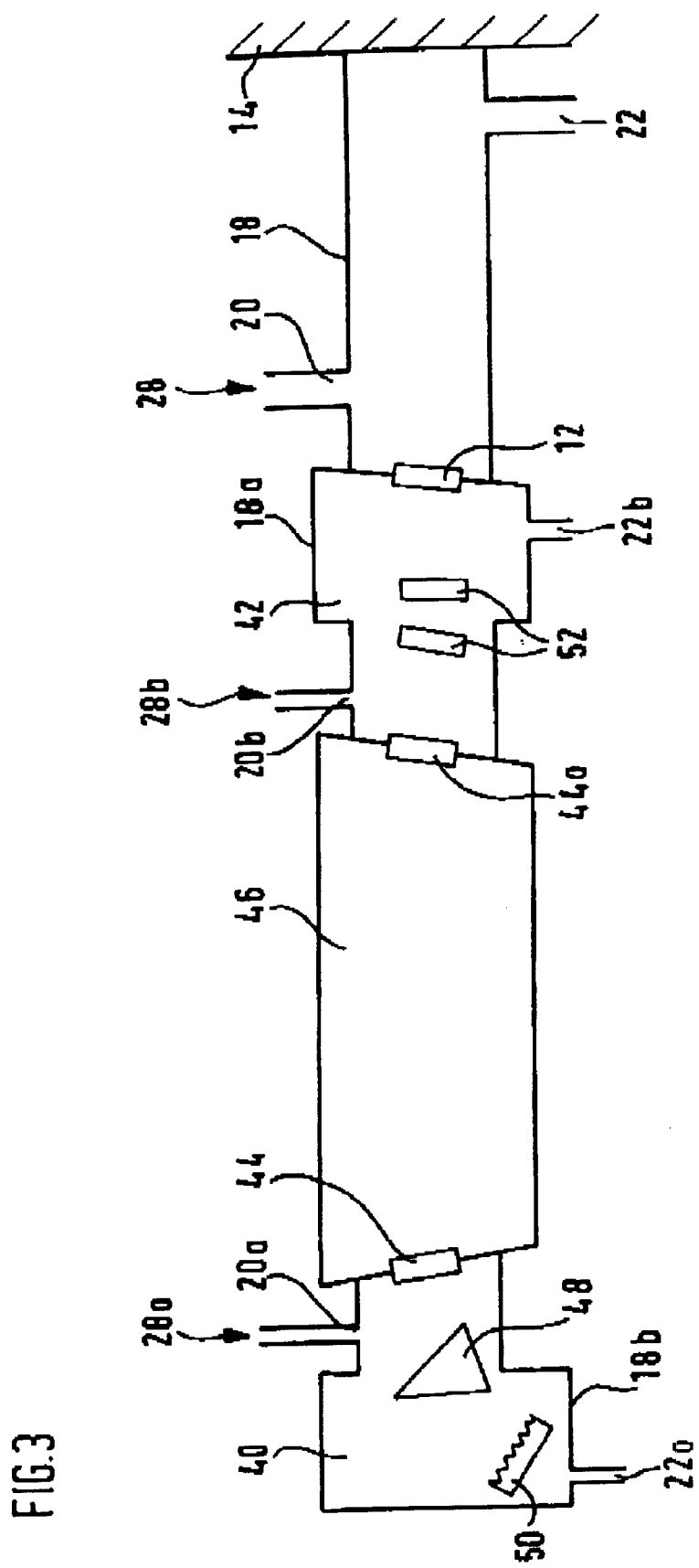
FIG. 3 shows a further illustrative embodiment of a device for flushing the optical path of a UV laser, in this case an excimer laser.

FIG. 3 shows a further device for flushing the optical path of the UV laser beam, in this case an excimer laser. In this illustrative embodiment, the use of the noble gas in the optical path is not limited just to the optical path between the laser and the object to be illuminated, but instead encapsulation and noble-gas flushing of optical components of the laser resonator itself is provided. This type of flushing of the optical path in the laser resonator itself is of importance, in particular, for microlithography lasers with a small linewidth at 193 nm.

FIG. 3 schematically shows an excimer laser of this type. The gas discharge is implemented in a laser tube 46. Optical modules 40 and 42 are arranged directly on the windows 44, 44*a* of the laser tube 46. The optical modules 40 and 42 are each arranged in casings 18*a*, 18*b*, respectively. The casings 18*a*, 18*b* have a function corresponding to the casing 18 described above. The optical module 40 contains, for example, a prism 48 and a grating 50. The optical module 42 contains, for example, etalons 52. These systems are used for the generation of extremely narrow-band UV radiation. Supplying the casings 18*a*, 18*b* with noble gas, in particular argon, corresponding to the above-described way in which the casing 18 is supplied, likewise presents the technical advantages already dealt with above. In the illustrative embodiment according to FIG. 3 it is possible, as described above with reference to FIG. 2, again to use a pressure change in the casing to change the wavelength.

What is claimed is:

1. Device for flushing an optical path of a UV laser beam from an output coupling unit of a laser system to an object to be illuminated, having a casing separating the optical path from an external atmosphere, characterized in that a gaseous atmosphere within the casing essentially only contains a flowing noble gas, and argon is provided as the noble gas, and a control system is provided for setting the noble gas pressure in the casing, in particular for keeping this pressure constant at a specified value.

2. Device for flushing an optical path of a UV laser beam from an output coupling unit of a laser system to an object to be illuminated, having a casing separating the optical path from an external atmosphere, characterized in that a gaseous atmosphere within the casing essentially only contains a flowing noble gas, and the casing has at least one inlet and at least one outlet for the noble gas, and a control system is provided for setting the noble gas pressure in the casing, in particular for keeping this pressure constant at a specified value.

3. Device for flushing an optical path of a laser beam having a wavelength in a range between 150 nm and 220 nm, the device having a casing separating the optical path from an external atmosphere, characterized in that a control system is provided for controlling a flowing noble gas pressure in the casing.

4. Device according to claim 3, wherein a gaseous atmosphere within the casing essentially only contains a noble gas.

5. Device according to claim 4, characterized in that argon is provided as the noble gas.

6. Device according to any of claims 3–5, characterized in that the casing has at least one inlet and at least one outlet for the noble gas.

7. Device according to any of claims 3–5, characterized in that the noble gas pressure in the casing is controlled for controlling the wavelength of the UV laser beam.

* * * * *